United States Patent [19]

Dietz et al.

[11] Patent Number: 5,264,032
[45] Date of Patent: Nov. 23, 1993

[54] PIGMENT PREPARATIONS

[75] Inventors: Erwin Dietz, Kelkheim; Manfred Urban, Wiesbaden, both of Fed. Rep. of Germany

[73] Assignee: Hoechst AG, Frankfurt am Main, Fed. Rep. of Germany

[21] Appl. No.: 964,514

[22] Filed: Oct. 21, 1992

[30] Foreign Application Priority Data

Oct. 23, 1991 [DE] Fed. Rep. of Germany ....... 4134933

[51] Int. Cl.$^5$ .................. C09B 67/50; C09B 67/22
[52] U.S. Cl. .................. 106/411; 106/410; 106/413; 106/493; 106/495; 106/497; 534/655; 534/753; 534/788; 534/789; 534/791; 534/818; 540/122; 540/123; 540/127; 544/63; 544/339; 544/341; 546/49; 546/56; 548/211; 548/457; 548/579
[58] Field of Search ............... 106/493, 495, 497, 410, 106/411, 413; 548/211, 457, 579; 540/122, 123, 127; 534/753, 788, 789, 791, 818, 655; 544/63, 339, 341; 546/49, 56

[56] References Cited

U.S. PATENT DOCUMENTS

| | | | |
|---|---|---|---|
| 3,650,792 | 3/1972 | Dietz | 106/466 |
| 4,536,219 | 8/1985 | Riou et al. | 106/21 |
| 4,986,852 | 1/1991 | Dietz et al. | 106/497 |
| 5,004,588 | 4/1991 | Nisula et al. | 423/226 |
| 5,071,482 | 12/1991 | Dietz et al. | 106/498 |
| 5,071,483 | 12/1991 | Dietz et al. | 106/498 |

FOREIGN PATENT DOCUMENTS 0243304 10/1987 European Pat. Off. .

*Primary Examiner*—Mark L. Bell
*Assistant Examiner*—Scott L. Hertzog
*Attorney, Agent, or Firm*—Connolly and Hutz

[57] ABSTRACT

Pigment preparation essentially comprising a) at least one pigment from the class of azo, anthrapyrimidine, anthanthrone, quinacridone, perinone, diketopyrrolopyrrole, dioxazine, flavanthrone, indanthrone, isoindolinone, isoviolanthrone, perylene, phthalocyanine, pyranthrone or thioindigo pigments or a mixture of pigments belonging to various classes, and b) at least one dispersant of the formula (I)

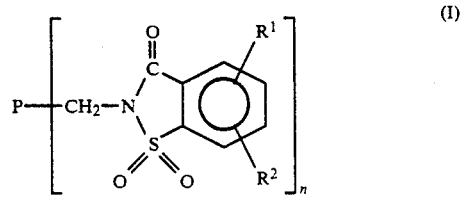

in which

P, independently of the pigments mentioned in a), is a radical of an anthanthrone azo, quinacridone, perinone, diketopyrrolopyrrole, dioxazine, indanthrone, perylene, phthalocyanine or thioindigo pigment, $R^1$ and $R^2$, independently of one another, are hydrogen, halogen, $C_1$–$C_4$-alkyl, $C_1$–$C_4$-alkoxy or nitro, and n is a number from 1 to 4, and their use for pigmenting of high-molecular-weight materials in the form of plastic compositions, melts, spinning solutions, varnishes, in particular of polyurethane-based aqueous varnishes or low-solvent high-solid acrylic varnishes, coating compositions and printing inks, in particular based on nitrocellulose.

20 Claims, No Drawings

PIGMENT PREPARATIONS

The present invention is in the technical field of pigment preparations and their use for the pigmenting of high-molecular-weight materials.

The dispersion of pigments in high-molecular-weight materials can result in a large number of problems, in particular if the pigments are to be dispersed not only in customary but also in novel low-solvent high-solid and highly polar aqueous coating systems. For instance, dispersion in some coating systems may remain incomplete, and the optimum color strength is not obtained. Incompletely dispersed agglomerates and large particles may interfere with further processing and, in particular, may result in sedimentation problems in the case of systems of low viscosity (lacquers and printing inks). Furthermore, flocculations in dispersion, storage or further processing can lead to unwanted rheological modifications of the system and to surface defects, and to losses in color strength and luster of the applied film.

These problems cannot be solved by the known pigment concentrates. In particular, dispersion in the above-mentioned novel coating systems leads to considerable problems.

U.S. Pat. No. 4,310,359 describes pigment concentrates which have improved flocculating stability and favorable rheological properties in coating systems. In aqueous coating systems, the pigment concentrates described in this publication lead in several cases to unsatisfactory results, and the process cannot be applied to certain classes of pigments. In addition, the compounds mentioned there have different structures.

U.S. Pat. No. 4,256,507 describes pigment concentrates based on pigment dispersants containing phthalimidomethylene groups. These pigment concentrates do not fulfil the requirements in many cases with respect to coloristic and rheological properties demanded of pigment concentrates. The compounds mentioned there also have different structures.

British Patent No. 1,367,635 describes quinophthalone dyes containing ortho-sulfobenzimidomethylene groups, which are used for the dyeing of fibers. Owing to their high solubility, these compounds are not suitable for use in the pigment sector.

The object of the present invention is to provide new dispersants for organic pigments and pigment preparations which can be prepared therefrom in a simple manner and have improved coloristic and rheological properties in high-molecular-weight materials. It has now been found that pigment preparations having excellent coloristic and rheological properties in customary as well as modern binder systems of the high-solid or water-based type can be obtained by surface modification of organic pigments using new dispersants preparable by reaction of hydroxymethylsaccharin or derivatives thereof with the organic pigment.

The present invention relates to pigment preparations consisting essentially of
a) at least one organic pigment from the class of azo, anthrapyrimidine, anthanthrone, quinacridone, perinone, diketopyrrolopyrrole, dioxazine, flavanthrone, indanthrone, isoindolinone, isoviolanthrone, perylene, phthalocyanine, pyranthrone or thioindigo pigments or a mixture of pigments belonging to various of the abovementioned classes, and
b) at least one dispersant of the formula (I)

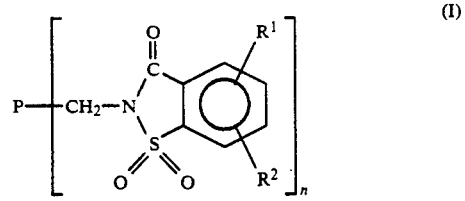

in which
P, independently of the pigments mentioned in a), is a radical of an azo, anthanthrone, quinacridone, perinone, diketopyrrolopyrrole, dioxazine, indanthrone, perylene, phthalocyanine or thioindigo pigment,
$R^1$ and $R^2$, independently of one another, are hydrogen, halogen, $C_1$-$C_4$-alkyl, $C_1$-$C_4$-alkoxy or nitro, preferably hydrogen, and
n is a number from 1 to 4, preferably from 1 to 3.6, and in which the $CH_2$ group of the saccharin radical is bound to an aromatic carbon atom of P.

In each case, "radical" is understood to mean the parent compound minus at least one hydrogen atom.

The abovementioned classes of organic pigments are known from the literature, for example from W. Herbst, K. Hunger, Industrielle Organische Pigmente (Industrial Organic Pigments) (1987), VCH Verlagsgesellschaft, Weinheim, Germany. Diketopyrrolopyrrole pigments are described in U.S. Pat. No. 4,579,949.

The number n expresses the degree of substitution obtained by condensation of the pigment compound on which the radical P is based. The optimum value for n depends on the chemical constitution, the crystalline and surface properties of the pigment and the properties of the application medium and must be determined experimentally in the individual case for each pigment-/application medium combination. If the values of n are too low or too high, optimum pigment properties are not achieved. Usually, the dispersant is a mixture of compounds of the formula I in which on average n parts of the saccharin radical are bound to one part of the pigment radical P. Therefore, n can also adopt fractional numerical values.

Preferred pigment preparations are those comprising at least one pigment from the class of indanthrone, perylene, quinacridone, phthalocyanine or perinone pigments.

Preferred pigment preparations are furthermore those comprising at least one dispersant of the formula (I) in which, independently of the pigments used, P is a radical of an indanthrone, perylene, quinacridone, phthalocyanine or perinone pigment.

Preferred pigment preparations are furthermore those which consist essentially only one of the pigments mentioned and one of the dispersants mentioned.

Particular preference is given to pigment preparations consisting essentially
a) 99.5 to 70% by weight, preferably 95 to 80% by weight, of at least one of the abovementioned pigments;
b) 0.5 to 30% by weight, preferably 5 to 20% by weight, of at least one of the abovementioned dispersants;
c) 0 to 10% by weight, preferably 0 to 5% by weight, of one or more surfactants; and
d) 0 to 10% by weight, preferably 0 to 5% by weight, of customary additives, the proportions of the components being based in each case on the total weight (100% by weight) of the pigment concentrate.

The present invention furthermore relates to dispersants of the formula (I)

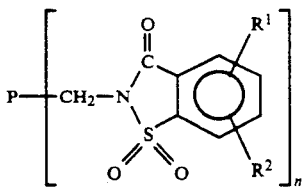

in which
- P is a radical of an azo, anthanthrone, quinacridone, perinone, diketopyrrolopyrrole, dioxazine, indanthrone, perylene, phthalocyanine or thioindigo pigment,
- $R^1$ and $R^2$, independently of one another, are hydrogen, halogen, $C_1$-$C_4$-alkyl, $C_1$-$C_4$-alkoxy or nitro, preferably hydrogen, and
- n is a number from 1 to 4, preferably from 1 to 3.6, and in which the $CH_2$ group of the saccharin radical is bound to an aromatic carbon atom of P.

The dispersants of the formula I can be prepared by customary processes by condensation of pigments with the corresponding saccharin derivative and formaldehyde, paraformaldehyde, another formaldehyde-releasing compound, for example trioxane, or the corresponding N-methylol derivative of saccharin in the presence of condensating agents at a temperature of between 0° C. and 150° C. Preferred condensating agents are 80 to 100% by weight sulfuric acid, oleum or polyphosphoric acid. The condensation product is precipitated by introducing the sulfuric or phosphoric acid solution into water or ice/water and isolated in the usual manner by filtration and washing until neutral. The degree of substitution can be determined by elemental analysis and NMR spectra.

When concentrated sulfuric acid or oleum is used as the condensating medium, it is possible for sulfo groups to be incorporated to a small extent in the compounds according to the invention.

The degree of substitution n of pigment P can be achieved directly. However, it is also possible to prepare a derivative of the formula I and adjust it to the final degree of substitution n in a further step. This adjustment of the degree of substitution n can take place in a subsequent process step (fine dispersion, finishing, wet or dry milling, final mixture).

When the pigment preparations are prepared, the dispersants can be added during the pigment synthesis, during the fine dispersion process, before or after a finishing process. The fine dispersion can be carried out in a mechanical process, for example wet or dry milling, or a chemical process, for example dissolution in strong acids or bases and precipitation or vatting and subsequent reoxidation. The pigment preparations can also be prepared by mixing the dispersants with the pigments The pigments contained in the pigment preparations according to the invention can be present as pure pigments, as mixtures of at least two pigments or as mixed crystals of at least two pigments.

The dispersant content in the pigment preparations is advantageously between 0.5 and 30% by weight, preferably 1 and 15% by weight, relative to the weight of the pigment. The improvement in the coloristic and rheological properties by virtue of addition of the dispersant increases with increasing amount, but only to a specified optimum concentration which depends on the chemical constitution, the crystalline and surface properties of the pigments, of the dispersant, and on the properties of the application medium and can be determined experimentally in the individual case for each pigment/dispersant/application medium combination.

Higher concentrations, in turn, lead to a deterioration of the properties. In the pigment preparations, the dispersants of the formula (I) can be derived from the pigment present in the preparation or from a different compound of the abovementioned classes of pigment. In any case, the addition of the dispersant results in an improvement in the coloristic and rheological properties.

However, the dispersants can lead to a shift in hue, in particular when they are derived from pigments which differ from the pigment of the pigment preparation, so that in a preferred embodiment the pigments mentioned above in a) and b) belong in each case to the same class.

The pigment preparations of the invention can additionally contain surfactants and further customary additives, such as resins, rheological additives, preservatives and/or dustproofing agents, such as described, for example, in K. Lindner, Tenside-Textilhilfsmittel-Waschrohstoffe, Volume 1, pages 837-917 (1964) or in N. Schonfeld, Grenzflachenaktive Ethylenoxid-Addukte, pages 42-95 (1976).

The pigment preparations according to the invention are distinguished by their excellent coloristic and rheological properties, in particular flocculating stability, dispersibility, rheology, luster and color strength.

The pigment preparations according to the invention are suitable in particular for the pigmenting of high-molecular-weight organic materials, for example cellulose ethers and cellulose esters, such as ethylcellulose, nitrocellulose, cellulose acetate, cellulose butyrate, natural resins or synthetic resins, such as polymerization resins or condensation resins, for example amino resins, in particular urea/- and melamine/formaldehyde resins, alkyd resins, acrylic resins, phenolic resins, polycarbonates, polyethylene, polypropylene, polyacrylonitrile, polyacrylic esters, polyamides, polyurethanes or polyesters, rubber, casein, silicone and silicone resins, either individually or in mixtures with one another.

It is immaterial whether the high-molecular-weight organic compounds mentioned are present in the form of plastic compositions, melts or in the form of spinning solutions, varnishes, coating compositions or printing inks. Depending on the particular application, it may prove advantageous to use the pigment preparations according to the invention as toners or in the form of preparations or dispersions. The pigment preparations are used in an amount of preferably 0.1 to 10% by weight, relative to the high-molecular-weight organic material to be pigmented. Particularly preferred coating systems are the new type of highly polar aqueous polyurethane-based varnishes and the low-solvent high-solids acrylic resin varnishes of high solids content. Customary coating systems from the class of alkyd/-melamine resin varnishes and two-component varnishes based on acrylic resins crosslinkable with polyisocyanate are also suitable. Of the large number of printing inks, those based on nitrocellulose are particularly suitable.

The pigment preparations according to the invention and the dispersants according to the invention are easily dispersible in many application media to a very fine state of division. These dispersions have high flocculating stability and exhibit excellent rheological properties, even with a high degree of pigmenting. They can be used to prepare coatings and prints of high color strength, high gloss and high transparency, which have excellent fastness properties. From the large number of known systems, an alkyd/melamine resin varnish (AM) based on a medium-oil, non-drying alkyd resin comprising synthetic fatty acids and phthalic anhydride and a melamine resin etherified with butanol and portions of a non-drying alkyd resin based on ricinenic acid (short-oil), a high-solid acrylic baking enamel based on a non-aqueous dispersion (TSA) and a polyurethane-based (PUR) aqueous varnish were selected for rating the properties.

The rheology of the mill base after dispersion is rated by the following five-step scale:

| 5 | highly fluid | 2 | slightly solidified |
| 4 | fluid | 1 | solidified |
| 3 | viscous | | |

After diluting the mill base to the pigment concentration, the viscosity is rated using a Rossmann visco-spatula, for example of the 301 type from Erichsen, Iserlohn. Before coating, the desired viscosity was adjusted in such a manner that it corresponded to a specific flow time in the Ford cup (nozzle diameter 4 mm) given in seconds (s). Gloss measurements were carried out using a multigloss gloss tester, for example from Byk-Mallinckrodt, Wesel, at an angle of 20° according to DIN 67530 (ASTM D 523). In the examples which follow, parts and percentages are by weight.

6 and 3% oleum is understood to mean a solution of 94 and 97% by weight of 100% sulfuric acid and 6 and 3% by weight of dissolved $SO_3$.

The degree of substitution n was determined in all examples not only by elemental analysis but also by $^1H$ NMR spectra, the basis for the determination being the ratio of the aliphatic to the aromatic protons.

EXAMPLE 1

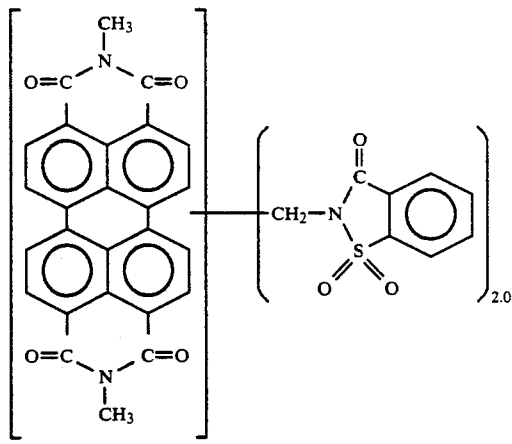
(II)

300 g of 6% oleum were initially introduced into a stirred vessel, and 20.9 g (0.05 mol) of N,N'-dimethylperylenetetracarboximide were then introduced at a temperature of 25° C. and dissolved. 42.6 g (0.2 mol) of hydroxymethylsaccharin were then added, the mixture was heated to 100° C. and stirred at this temperature for another 4 hours. The solution was allowed to cool to 25° C., poured into 2000 g of ice water, the product was filtered off with suction and washed until neutral. The filter residue was stirred with 250 ml of water, brought to a pH of 9 with 2.25 g of 33% sodium hydroxide solution, stirred for another hour, filtered off with suction, washed until neutral and dried, giving 40.85 g of the dispersant of the formula II.

Analysis: Calculated: C, 62.4%; H, 3.0%; N, 6.9%; S, 7.9%. Found: C, 61.2%; H, 2.9%; N, 6.7%; S, 8.0%. $^1H$ NMR spectrum in $D_2SO_4$ (in ppm): δ 7.5–9.3: 14 aromatic H; 4.5–6.0: 2 aliphatic $CH_2$; 3.5–3.9: 2 $CH_3$.

EXAMPLE 1a 15 g of C.I. Pigment Red 179, prepared according to U.S. Pat. No. 5,110,931 were mechanically mixed with 0.15 g of the dispersant of the formula (II), and the pigment preparation was incorporated in AM varnish and PUR varnish and tested. The AM varnish gave a coating of high hiding power and color strength. The rheology was given a rate of 5, and the gloss was 81.

Without dispersant, the coating had a much lower color strength, the rheology was given a rating of 1 to 2, and the gloss was 35.

This was repeated, except that the dispersant of the formula (II) was replaced by a dispersant based on N,N'-dimethylperylenecarboximide and hydroxymethyl phthalimide having a degree of substitution n of 2.6 and prepared according to U.S. Pat. No. 4,256,507 Example A, experiment B, giving a coating which had a much lower color strength than that obtained with a dispersant of the formula II. The rheology was given a rating of 5, and the gloss was 78.

The PUR varnish in which the pigment preparation described at the beginning of this example was incorporated gave a coating of high hiding power and color strength. The rheology was given a rating of 5 and the viscosity was 3.0 s. Without dispersant, the coating had a somewhat lower color strength. The rheology was given a rating of 5, and the viscosity was 3.5 s.

This was repeated, except that the dispersant of the formula (II) was replaced by a dispersant based on N,N'-dimethylperylenetetracarboximide and hydroxymethyl phthalimide, giving a coating of significantly lower color strength. The rheology was given a rating of 5, and the viscosity was 2.2 s.

EXAMPLE 2

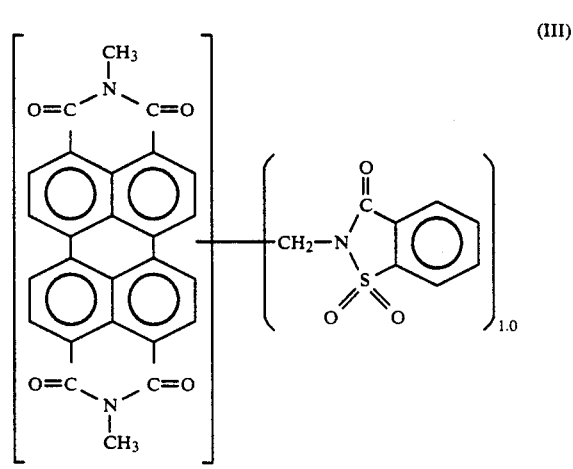
(III)

300 g of 6% oleum were initially introduced into a stirred vessel, and 20.9 g (0.05 mol) of N,N'-dimethylperylenetetracarboximide were then introduced at a temperature of 25° C. and dissolved. A mixture of 6 g of paraformaldehyde (corresponding to 0.2 mol of formaldehyde) and 36.6 g (0.2 mol) of saccharin were then added, the mixture was heated to 100° C. and stirred at this temperature for another 4 hours. The solution was allowed to cool to 25° C., poured into 2000 g of ice water, the product was filtered off with suction and washed until neutral. The filter residue was stirred with 250 ml of water, brought to a pH of 9 with 2.25 g of 33% sodium hydroxide solution, stirred for another hour, filtered off with suction, washed until neutral and dried, giving 25.8 g of the dispersant of the formula (III) still containing about 50% of unsubstituted N,N'-dimethylperylenetetracarboximide.

Analysis: (calculated for the 1:1 mixture of (III) and unsubstituted starting material): Calculated: C, 69.8%; H, 3.2%; N, 6.8%; S, 3.1%. Found: C, 68.4%; H, 2.9%; N, 6.6%; S, 2.9%. $^1$H NMR spectrum in $D_2SO_4$ (in ppm): δ 7.6–9.3: 19 aromatic H; 4.5–5.8: 1 aliphatic $CH_2$.

EXAMPLE 2a 15 g of C.I. Pigment Red 179, prepared according to U.S. Pat. No. 5,110,931 were mechanically mixed with 0.15 g of the dispersant of the formula (III), and the pigment preparation was incorporated in AM varnish and tested. A coating of high hiding power and color strength was obtained. The rheology was given a rating of 4 to 5, the viscosity was 3.53 s and the gloss 74.

Without dispersant, the coating had lower color strength, the rheology was given a rating of 1 to 2, the viscosity was 4.3 s and the gloss 35.

EXAMPLE 3

300 g of 6% oleum were initially introduced into a stirred vessel, and 19.6 g (0.5 mol) of perylenetetracarboxylic dianhydride were then introduced at a temperature of 25° C. and dissolved. 42.6 g (0.2 mol) of hydroxymethylsaccharin were then added, the mixture was heated to 100° C. and stirred at this temperature for another 4 hours. The solution was allowed to cool to 25° C., poured into 2000 g of ice water, the product was filtered off with suction, washed until neutral and dried, giving 37.4 g of the dispersant of the formula (IV).

Analysis: Calculated: C, 62.0%,; H, 2.3%; N, 3.4%; S, 7.8%. Found: C, 60.9% H, 2.6%; N;3.4%; S 7.2%. $^1$H NMR spectra in $D_2SO_4$ (in ppm): δ 7.6–9.2: about 13 aromatic H; 5.0–6.1: about 1.8 aliphatic $CH_2$.

EXAMPLE 3a 1050 ml of deionized water were initially introduced into a stirred vessel, and 50 g of perylenetetracarboxylic dianhydride, prepared according to U.S. Pat. No. 4,650,879 and 0.5 g of the dispersant of the formula (IV), both in the form of a moist press cake, were then introduced with stirring. The mixture was cooled to a temperature of 0° to 5° C., and 104 g of 40% monomethylamine solution were added dropwise at this temperature, and stirring at 0° to 5° C. was continued for 15 minutes. A solution of 28.5 g of anhydrous calcium chloride and 94.5 ml of water were then added dropwise at 0° to 5° C. over a period of 15 minutes, and stirring at this temperature was continued for 1 hour. The mixture was then heated to 80° C. and stirred at about 80° C. for another hour. A suspension of 2.7 g of distearyldimethylammonium chloride and 117 ml of water were then added dropwise, and the mixture was stirred at 80° C. for another hour. It was cooled to 50° C., brought to a pH of 7 to 7.5 by dropwise addition of 98% formic acid, stirred at 50° C. for another 30 minutes, filtered off with suction, and the product was washed with water until free from chloride and dried.

This gave 54.2 g of a pigment preparation based on Pigment Red 179, which, upon incorporation in TSA varnish produced transparent coatings of high color strength. After the reaction, the dispersant had the formula II, except that n was the number 1.8.

EXAMPLE 4

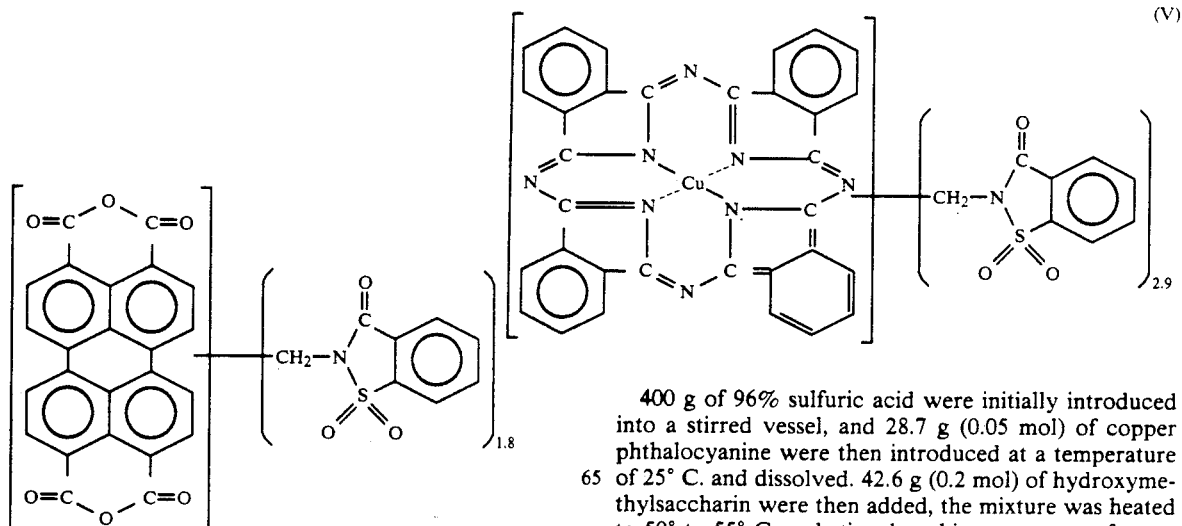

(V)

400 g of 96% sulfuric acid were initially introduced into a stirred vessel, and 28.7 g (0.05 mol) of copper phthalocyanine were then introduced at a temperature of 25° C. and dissolved. 42.6 g (0.2 mol) of hydroxymethylsaccharin were then added, the mixture was heated to 50° to 55° C. and stirred at this temperature for another 5 hours. The solution was allowed to cool to 25°

C., poured into 2000 g of ice water, the product was filtered off with suction and washed until neutral. The filter residue was stirred with 1000 ml of water, brought to a pH of 11 with 1.24 g of 33% sodium hydroxide solution, stirred for another hour, filtered off with suction, washed until neutral and dried, giving 57.0 g of the dispersant of the formula (V).

Analysis: Calculated: C, 58.1%; H, 12.7%; N, 13.4%; S, 8.1%. Found: C, 58.1%; H 3.3%; N, 13.9%; S 7.2%.

EXAMPLE 4a

A 1 liter porcelain vessel was filled with 35 g of copper phthalocyanine crude pigment of β-phase, 10.6 g of dispersant of the formula (V), 165 ml of water and 1200 g of quartz beads of diameter 2 mm, and the mixture was then milled in a vibrating mill for 15 hours. The quartzite beads were then removed from the mill base by screening, and the mill base was filtered off with suction and dried, giving 36.4 g of pigment preparation which, on incorporation in AM, TSA and PUR varnish produced coatings of high color strength. Without a dispersant, the coatings had a much lower color strength. The rheology and viscosities of the coatings with and without dispersant were the same.

EXAMPLE 4b 75 g of 85% isobutanol, 50 g of finely divided mill base composed of C.I. Pigment Violet 23 (containing 22% of salt from the synthesis), prepared according to U.S. Pat. No. 4,253,839 2.5 g of the dispersant of the formula (V) as press cake and 2.5 g of 98% formic acid were introduced in succession into a stirred vessel, and the mixture was stirred at 25° C. for 22 hours. During this time, another 100 g of 85% isobutanol were added drop-wise. 300 ml of water were then added, and the mixture was heated to boiling for 5 hours. The isobutanol was then distilled off, and the residue filtered off with suction, washed until neutral and dried.

This gave 40.4 g of pigment preparation which, upon incorporation in polyvinyl chloride, produced transparent colorations of high color strength.

EXAMPLE 5

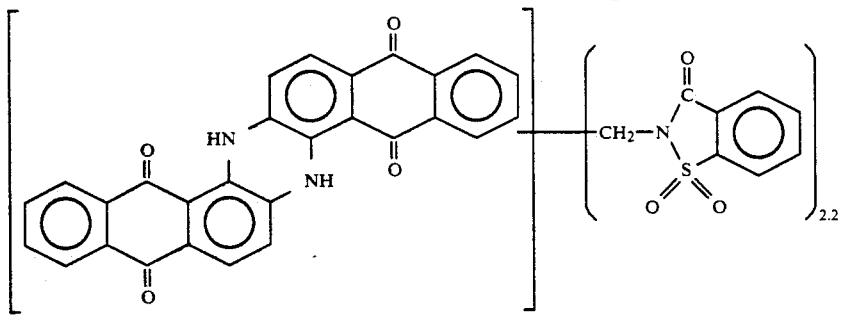

100 g of 3% oleum were initially introduced into a stirred vessel, and 10 g (0.02 mol) of indanthrone were then introduced at a temperature of 25° C. and dissolved. 19.3 g (0.09 mol) of hydroxymethylsaccharin were then added, the mixture was heated to 60° C. and stirred at this temperature for another 4 hours. The solution was allowed to cool to 25° C., poured into 500 g of ice water, the product was filtered off with suction and washed until neutral. The filter residue was stirred with 250 ml of water, brought to a pH of 9 with 2.0 g of 33% sodium hydroxide solution, stirred for another hour, filtered off with suction, washed until neutral and dried, giving 20.6 g of the dispersant of the formula (VI).

Analysis: Calculated: C, 62.6%; H, 2.9%; N, 7.1%; S, 8.1%. Found: C, 61.0%; H, 2.9%; N, 6.2%; S, 8.6%.

$^1$H NMR spectrum in $D_2SO_4$ (in ppm): δ 7.5–9.0: about 18 aromatic H; 5.0: about 2 $CH_2$.

This was repeated, using the same molar amount of 4-chlorohydroxymethylsaccharin instead hydroxymethylsaccharin, giving a dispersant having similar properties.

EXAMPLE 5a 3200 g of steel balls of diameter 10 mm were introduced into a 1.4 liter rolling mill, 27 g of crude indanthrone pigment recrystallized from sulfuric acid and 3 g of the dispersant of the formula (VI) were added, and the mixture was then rolled for 24 hours. The rotating speed was 70% of the critical rotating speed. The mill base was then separated off from the grinding medium by screening, introduced into 40 g of 85% isobutanol, and the mixture was stirred at 25° C. for 24 hours. 150 ml of water and 5 g of 98% formic acid were added, the mixture was heated to boiling for 5 hours, and the isobutanol was distilled off. The product was then filtered off with suction, washed with water until neutral and dried, giving a pigment preparation which, upon incorporation in TSA varnish produced transparent coatings of high color strength.

EXAMPLE 6

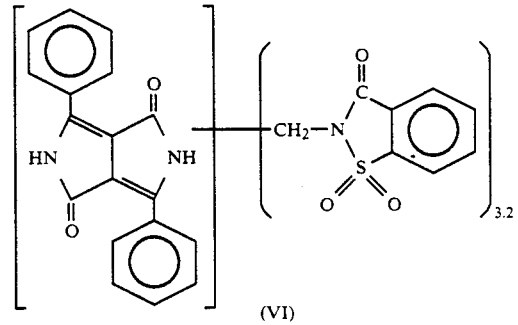

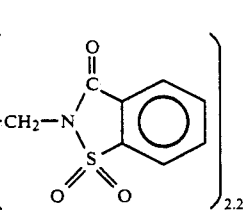

150 g of 100% sulfuric acid were initially introduced into a stirred vessel, and 7.2 g (0.03 mol) of diketopyrrolopyrrole were then introduced at a temperature of 25° C. and dissolved. 21.3 g (0.1 mol) of hydroxmethylsaccharin were then added, the mixture was heated to 50° C. and stirred at this temperature for another 5 hours. The solution was allowed to cool to 25° C., poured into 1500 g of ice water, the product was filtered off with suction, washed until neutral and dried. This gave 22.6 g of the dispersant of the formula (VII).

Analysis: Calculated: C, 57.4%; H, 3.1%; N, 8.0%; S, 11.2%. Found: C, 55.9%; H, 3.2%; N, 8.1%; S, 10.9%.

$^1$H NMR spectrum in $D_2SO_4$ (in ppm): δ 7.0-8.6: about 19 aromatic H; 4.6-6.2: about 3 $CH_2$.

This was repeated, using the same molar amount of 4-methoxy-7-nitrohydroxymethylsaccharin instead of hydroxymethylsaccharin, giving a dispersant having similar properties.

EXAMPLE 6a 9.75 g of C.I. Pigment Red 254 were mechanically mixed with 0.25 g of the dispersant of the formula (VII), and the pigment preparation was incorporated in AM varnish and tested. A coating of high color strength was obtained. The rheology was given a rating of 5, and the gloss was 75.

EXAMPLE 7 excellent cross-coating fastness. The rheology was given a rating of 5, and the gloss was 83.

Without a dispersant, the coating had considerably more hiding power, was brighter and had a lower color strength. The rheology was given a rating of 1, and the gloss was 25. The PUR varnish gave a transparent coating of high color strength. The rheology was given a rating of 5, and the gloss was 80. Without dispersant, the coating had considerably more hiding power, was brighter and had a lower color strength. The rheology was given a rating of 1 to 2, and the gloss was 42.

This was repeated, except that the dispersant of the formula (VIII) was replaced by a dispersant based on C.I. Pigment Orange 43, hydroxymethylhalofatty amides and amines containing basic groups and prepared according to US Patent No. 3,973,981 (Example 1, Preparation 5), giving, upon incorporation in AM varnish, a coating which is much darker and more opaque than that obtained with the dispersant of the formula (VIII). The rheology was given a rating of 4 to 5, and the gloss was 46.

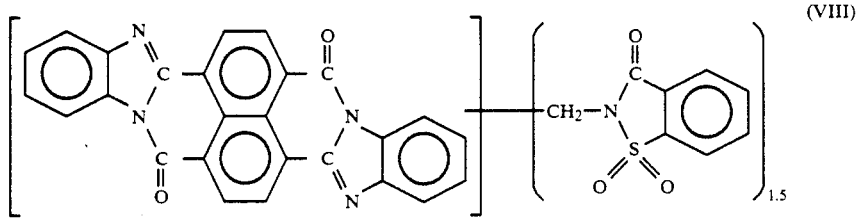

(VIII)

250 g of 100% sulfuric acid were initially introduced into a stirred vessel, and 20.6 g (0.05 mol) of C.I. Pigment Orange 43 were then introduced at a temperature of 25° C. and dissolved. 42.6 g (0.2 mol) of hydroxymethylsaccharin were then added, the mixture was heated to 105° C. and stirred at this temperature for another 4 hours. The solution was allowed to cool to 25° C., poured into 2000 g of ice water, the product was filtered off with suction and washed until neutral. The filter residue was stirred with 250 ml of water, brought to a pH of 13.6 with 7.5 g of 33% sodium hydroxide solution, stirred for another hour, filtered off with suction, washed until neutral and dried, giving 35.6 g of the dispersant of the formula (VIII).

Analysis: Calculated: C, 64.7%; H, 2.8%; N, 10.9%; S, 6.8%. Found: C, 63.3%; H, 2.9%; N, 11.1%; S, 6.9%.

$^1$H NMR spectrum in $D_2SO_4$ (in ppm): δ 7.5-9.2: about 16.5 aromatic H; 5.0-5.4: 3 aliphatic H.

This was repeated, using the same molar amount of 5-methylhydroxymethylsaccharin instead of hydroxymethylsaccharin, giving a dispersant having similar properties.

EXAMPLE 7a 9.5 g of C.I. Pigment Orange 43 were mechanically mixed with 0.5 g of the dispersant of the formula (VIII), and the pigment preparation was incorporated in AM varnish and PUR varnish and tested. The AM varnish gave a transparent coating of high color strength and

EXAMPLE 7b 76 g of a crude 4,10-dibromoanthanthrone pigment in the form of a moist press cake were stirred with 130 ml of water. 4 g of the dispersant of the formula (VIII) and 5 g of 98% formic acid were added to the suspension, and the mixture was stirred for another 15 minutes. This suspension was then poured into a pearl mill which had been filled with 1160 g of quartzite beads of diameter 1 mm, and the mixture was milled at a rotating speed of 2800 revolutions per minute for 2 hours. The mill base was then removed by screening, and the quartzite beads were rinsed with water. The suspension was filtered off with suction and washed with water. The filter cake was then stirred with such an amount of water that the weight of the suspension was 960 g. 240 g of 100% n-butanol were then added, and the mixture was heated to boiling for 3 hours. The n-butanol was then distilled off, the product was filtered off with suction at 50° C., washed with water and dried at 80° C., giving 79.3 g of pigment preparation. After incorporation in AM varnish and testing, coatings of high color strength were obtained. The rheology was given a rating of 4 to 5 and the gloss was 70.

If the dispersant was omitted in the preparation of the pigment preparation, a coating of significantly lower color strength was obtained. The rheology was given a rating of 1 and the gloss was 64.

EXAMPLE 8

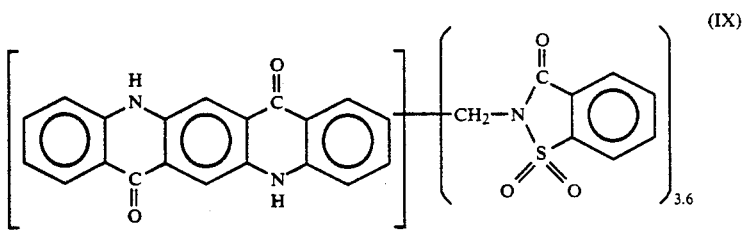

350 g of polyphosphoric acid (82 to 84% of $P_2O_5$) were initially introduced into a stirred vessel and heated to 5° C. 17.4 g (0.05 mol) of 2,5-dianilinoterephthalic acid were introduced at that temperature over 1 hour.

Stirring at 125° C. was continued for 1 hour. The mixture was then cooled to 80° C., and 42.6 g (0.2 mol) of hydroxymethylsaccharin were introduced at this temperature over a period of 30 minutes. The mixture was then heated to 120° C. and stirred at this temperature for another 4 hours. After reaction was complete, the solution was poured into 2000 g of ice water, stirring was continued for 1 hour, the product was filtered off with suction, washed until neutral and dried, giving 50.7 g of the dispersant of the formula (IX).

Analysis: Calculated: C, 57.6%; H, 3.0%; N, 7.7%; S, 11.3%. Found: C, 56.8%; H, 3.0%; N, 7.5%; S, 10.2%.

$^1H$ NMR spectrum in $D_2SO_4$ (in ppm): δ 7.4–9.6: about 20 aromatic H; 4.9–5.8: about 7 aliphatic H.

This is repeated, using the same molar amount of 4,7-dichlorohydroxymethylsaccharin instead of hydroxymethylsaccharin, giving a dispersant having similar properties.

EXAMPLE 8a 44 g of a crude 2,9-dimethylquinacridone pigment in the form of a moist press cake were stirred with 270 g of 100% isobutanol. 4.4 g of the dispersant of the formula (IX) were introduced into this suspension in the form of a moist press cake, and 6.6 g of 33% sodium hydroxide solution were added dropwise. The mixture was then heated in an autoclave to 125° C. and stirred at this temperature for 3 hours. It was then cooled to 90° C., and the isobutanol was distilled off. After cooling to 50° C., the pigment preparation was filtered off with suction at this temperature, washed with water until neutral and dried at 80° C., giving 46.2 g of pigment preparation. After incorporation in PUR varnish and testing, a transparent coating of high color strength was obtained. The rheology was given a rating of 4.

Without dispersant, the coating was more hiding and a had a lower color strength. The rheology was given a rating of 4.

This was repeated, except that the dispersant of the formula IX was replaced by a dispersant based on quinacridone sulfonamides, prepared according to U.S. Pat. No. 4,310,359 Preparation Example 1, giving coatings of much lower color strength. Upon incorporation in AM varnish, a coating of high color strength was obtained. Without dispersant, the coating had a somewhat lower color strength.

EXAMPLE 9

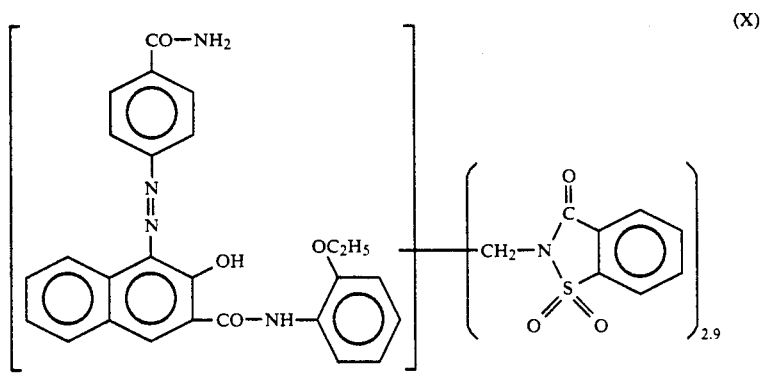

150 g of polyphosphoric acid (82 to 84% of $P_2O_5$) were initially introduced into a stirred vessel, and 5.7 g (0.01 mol) of C.I. Pigment Red 170 were then introduced at 80° C. and dissolved. 10.7 g (0.05 mol) of hydroxymethylsaccharin were then added, the mixture was heated to 95° C. to 100° C. and stirred at this temperature for 4 hours. The solution was poured into 1000 g of ice water, the product was filtered off with suction, washed until neutral and dried at 80° C., giving 12.8 g of the dispersant of the formula (X).

Analysis: Calculated: C, 57.9%; H, 3.6%; N, 9.5%; S, 9.7%. Found: C, 56.7%; H, 3.6%; N, 8.3%; S, 9.0%.

$^1H$ NMR spectrum in $D_2SO_4$ (in ppm): δ 7.4–9.2: about 22 aromatic H; 4.7–6.0: about 6 H.

EXAMPLE 9a 9.5 g of C.I. Pigment Red 170 were mechanically mixed with 0.5 g of the dispersant of the formula (X), and the pigment preparation was incorporated in AM varnish and tested. A coating of high color strength was obtained. The rheology was given a rating of 4, and the gloss was 77. Without dispersant, the coating was brighter, the rheology was given a rating of 2, and the gloss was 75.

EXAMPLE 10

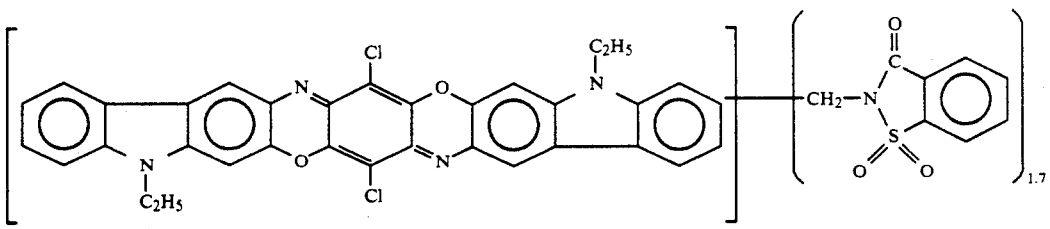

1200 g of polyphosphoric acid (82 to 84% of $P_2O_5$) were initially introduced into a stirred vessel, heated to 80° C., and 22.1 g of salt-free C.I. Pigment Violet 23 were added at this temperature over a period of ¼ hour. 32.0 g of hydroxymethylsaccharin were then added, the mixture was heated to 120° C. and stirred at this temperature for another 5 hours. The solution was then poured into 3000 g of ice water, the product was filtered off with suction and washed with water until neutral. The filter residue was stirred with 750 g of 1% sodium hydroxide solution, stirred for another hour, filtered off with suction, washed with water until neutral and dried, giving 34.5 g of the dispersant of the formula (XI).

Analysis: Calculated: C, 62.1%; H, 3.3%; N, 8.7%; Cl, 7.7%; S, 5.9%. Found: C, 59.0%; H, 4.0%; N, 8.0%; Cl, 6.9%; S, 4.7%.

EXAMPLE 10a 75 g of 85% isobutanol, 50 g of finely divided mill base composed of C.I. Pigment Violet 23 (containing 22% of salt from the synthesis, prepared according to U.S. Pat. No. 4,253,839 0.5 g of the dispersant of the formula (XI), 2.5 g of 50% alkylphenol polyglycol ether sulfate and 2.5 g of 98% formic acid were introduced in succession into a stirred vessel and the mixture was stirred at 25° C. for 20 hours. During this time, another 75 g of 85% isobutanol were added dropwise. 300 ml of water were then added, and the mixture was heated to boiling for 5 hours. The isobutanol was then distilled off and the pigment preparation was filtered off with suction, washed until neutral and dried, giving 37.9 g of pigment preparation which, upon incorporation in nitrocellulose-based printing ink, gave transparent prints of high color strength and gloss.

What is claimed is:

1. A pigment preparation consisting/essentially of
 a) at least one pigment from the class of azo, anthrapyrimidine, anthanthrone, quinacridone, perinone, diketopyrrolopyrrole, dioxazine, flavanthrone, indanthrone, isoindolinone, isoviolanthrone, perylene, phthalocyanine, pyranthrone or thioindigo pigments or a mixture of pigments belonging to various of the abovementioned classes, and
 b) at least one dispersant of the formula (I)

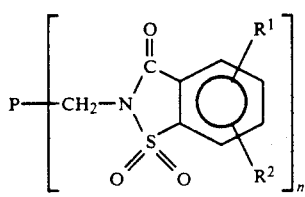

in which

P, independently of the pigments mentioned in a), is a radical of an azo, anthanthrone, quinacridone, perinone, diketopyrrolopyrrole, dioxazine, indanthrone, perylene, phthalocyanine or thioindigo pigment, $R^1$ and $R^2$, independently of one another, are hydrogen, halogen, $C_1$–$C_4$-alkyl, $C_1$–$C_4$-alkoxy or nitro, and n is a number from 1 to 4, and in which the $CH_2$ group of the saccharin radical is bound to an aromatic carbon atom of P.

2. A pigment preparation as claimed in claim 1, which contains at least one pigment from the class of indanthrone, perylene, quinacridone, phthalocyanine or perinone pigments.

3. A pigment preparation as claimed in claim 1, which contains at least one dispersant of the formula (I) in which the radical P, independently of the pigments used, is a radical of an indanthrone, perylene, quinacridone, phthalocyanine or perinone pigment.

4. A pigment preparation as claimed in claim 1, wherein n is a number from 1 to 3.6.

5. A pigment preparation as claimed in claim 1, wherein $R^1$ and $R^2$ are each hydrogen.

6. A pigment preparation as claimed in claim 1, consisting essentially of
 a) 99.5 to 70% by weight of at least one of the pigments mentioned;
 b) 0.5 to 30% by weight of at least one of the dispersants mentioned;
 c) 0 to 10% by weight of one or more surfactants, the proportions of the components being based in each case on the total weight of the pigment preparation.

7. A pigment preparation as claimed in at least one of claim 1, consisting essentially of
 a) 95 to 80% by weight of at least one of the pigments mentioned;
 b) 5 to 20% by weight of at least one of the dispersants mentioned;
 c) 0 to 5% by weight of one or more surfactants, the proportions of the components being based in each case on the total weight of the pigment preparation.

8. A pigment preparation as claimed in claim 1, wherein the content of the dispersants(s) is between 0.5 and 30% by weight relative to the weight of the pigment(s) used.

9. A pigment preparation as claimed in claim 1, wherein the content of the dispersant(s) is between 1to 15% by weight relative to the weight of the pigment(s) used.

10. A pigment preparation as claimed in claim 1, consisting essentially of only one pigment and one dispersant.

11. A pigment preparation as claimed in claim 1, wherein the pigments on which the radical P of the dispersant is based and the pigments used both belong to the same class.

12. A dispersant of formula (I)

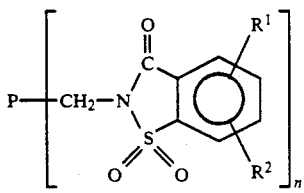

in which
- P, independently of the pigments mentioned in a), is a radical of an azo, anthanthrone, quinacridone, perinone, diketopyrrolopyrrole, dioxazine, indanthrone, perylene, phthalocyanine or thioindigo pigment,
- $R^1$ and $R^2$, independently of one another, are hydrogen, halogen, $C_1$-$C_4$-alkyl, $C_1$-$C_4$-alkoxy or nitro, and
- n is a number from 1 to 4, and in which the $CH_2$ group of the saccharin radical is bound to an aromatic carbon atom of P.

13. A dispersant as claimed in claim 12, wherein $R^1$ and $R^2$ are each hydrogen.

14. A dispersant as claimed in claim 12, wherein n is a number from 1 to 3.6.

15. A process of the preparation of a dispersant as claimed in claim 12, which comprises condensing the organic pigment on which the radical P is based with the corresponding saccharin derivative and formaldehyde or a formaldehyde-releasing compound or with the corresponding N-methylol derivative of saccharin in the presence of a condensing agent at a temperature of between 0° C. and 150° c.

16. A process as claimed in claim 15, wherein the condensing agent is sulfuric acid or polyphosphoric acid.

17. Method of pigmenting high-molecular-weight materials by adding a pigment preparation as claimed in claim 1 to the high-molecular-weight material to be pigmented.

18. Method of pigmenting as claimed in claim 17 wherein the high-molecular-weight materials are in the form of plastics compositions, melts, spinning solutions, varnishes, coating compositions or printing inks.

19. Method of pigmenting as claimed in claim 18 wherein the varnishes are highly polar, aqueous polyurethane-based varnishes or low-solvent high-solid acrylic varnishes.

20. Method of pigmenting as claimed in claim 18 wherein the printing inks are based on nitrocellulose.

* * * * *